(12) United States Patent
Yamasaki et al.

(10) Patent No.: US 10,193,473 B2
(45) Date of Patent: Jan. 29, 2019

(54) ACTUATOR

(71) Applicant: CANON KABUSHIKI KAISHA, Tokyo (JP)

(72) Inventors: Ryo Yamasaki, Tokyo (JP); Makoto Oikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/478,460

(22) Filed: Apr. 4, 2017

(65) Prior Publication Data

US 2017/0207727 A1     Jul. 20, 2017

Related U.S. Application Data

(63) Continuation of application No. 14/464,827, filed on Aug. 21, 2014, now Pat. No. 9,641,104.

(30) Foreign Application Priority Data

Aug. 26, 2013 (JP) .................................. 2013-174793

(51) Int. Cl.
*H01L 41/04* (2006.01)
*H02N 2/02* (2006.01)
*H02N 2/00* (2006.01)
*H02N 2/10* (2006.01)

(52) U.S. Cl.
CPC ......... *H02N 2/0055* (2013.01); *H02N 2/0015* (2013.01); *H02N 2/103* (2013.01)

(58) Field of Classification Search
CPC .................................................... H02N 2/103
See application file for complete search history.

(56) References Cited

U.S. PATENT DOCUMENTS 5,521,457 A * 5/1996 Kawasaki ............... B06B 1/06
                                                           310/352
6,211,603 B1    4/2001 Iino et al.
7,432,633 B2   10/2008 Sakano
(Continued)

FOREIGN PATENT DOCUMENTS

JP        4-114300 U     10/1992
JP         9-47045 A      2/1997
(Continued)

OTHER PUBLICATIONS

Office Action dated Jun. 6, 2017, in Japanese Patent Application No. 2013-174793.

*Primary Examiner* — J. San Martin
(74) *Attorney, Agent, or Firm* — Venable LLP

(57) ABSTRACT

The actuator includes a vibration plate including a fixing portion for fixing the vibration plate to a holding member, and a connection portion for connecting a center portion and the fixing portion, and is provided between a surface and a friction-sliding surface in a direction in which the vibration plate is pressed against the rotor by a pressurizing force produced by a pressure member. When finishing a surface on which a piezoelectric device is to be fixed to the vibration plate to a uniform surface by polishing, a decrease in the performance of the ultrasonic motor due to deformation of the vibration plate that is caused by warping of support portions that extend from both ends thereof or by burrs or the like can be prevented, and the time required to polish the vibration plate can be reduced.

9 Claims, 6 Drawing Sheets

(56) References Cited

U.S. PATENT DOCUMENTS

| | | |
|---|---|---|
| 7,922,291 B2 | 4/2011 | Kubo et al. |
| 7,952,258 B2 | 5/2011 | Mori |
| 7,999,439 B2 | 8/2011 | Sakamoto |
| 8,816,568 B2 | 8/2014 | Seki et al. |
| 9,143,058 B2 | 9/2015 | Oikawa et al. |
| 9,537,429 B2 | 1/2017 | Oikawa et al. |
| 9,641,104 B2 * | 5/2017 | Yamasaki ............ H02N 2/0055 |
| 2006/0186760 A1 | 8/2006 | Sakano |
| 2009/0278421 A1 | 11/2009 | Hamamoto et al. |
| 2011/0309722 A1 | 12/2011 | Seki et al. |
| 2013/0033152 A1 | 2/2013 | Yamasaki et al. |
| 2013/0033771 A1 | 2/2013 | Oikawa et al. |
| 2013/0070350 A1 | 3/2013 | Oikawa et al. |
| 2013/0113339 A1 | 5/2013 | Kojima |
| 2013/0193803 A1 | 8/2013 | Yamasaki et al. |
| 2014/0319966 A1 | 10/2014 | Seki et al. |
| 2015/0158184 A1 | 6/2015 | Kamijo et al. |
| 2016/0118913 A1 * | 4/2016 | Nishitani ............... H02N 2/001 |
| | | 310/323.05 |
| 2016/0126864 A1 | 5/2016 | Araki |

FOREIGN PATENT DOCUMENTS

| | | |
|---|---|---|
| JP | 2004-304887 A | 10/2004 |
| JP | 2007-276330 A | 10/2007 |
| JP | 2008-125147 A | 5/2008 |
| JP | 2011-254587 A | 12/2011 |
| JP | 2012-005309 A | 1/2012 |
| JP | 2013-038878 A | 2/2013 |

* cited by examiner

ACTUATOR

This application is a continuation of U.S. patent application Ser. No. 14/464,827, filed Aug. 21, 2014, and which claims the benefit of Japanese Patent Application No. 2013-174793, filed Aug. 26, 2013, which are hereby incorporated by reference herein in their entirety.

BACKGROUND OF THE INVENTION

Field of the Invention

The present invention relates to an actuator that drives by causing a vibrator to generate an elliptical vibration to cause a friction member to move with respect to the vibrator.

Description of the Related Art

An actuator has been conventionally used as a driving source of, for example, a camera or a lens, to take advantage of characteristics thereof such as silent operation, a driving capability from a low speed to a high speed, and a high torque output.

For example, Japanese Patent Application Laid-Open No. 2011-254587 discloses an ultrasonic motor as an actuator that includes a friction member and a vibrator including a vibration plate and a piezoelectric device. The vibrator is arranged in a friction-contact condition in which the vibrator is pressurized by the friction member. When an ultrasonic vibration is excited in the vibrator that is in the friction-contact condition, an elliptical motion arises at a portion of the vibrator that is in contact with the friction member, and a relative movement is performed between the friction member and the vibrator.

The vibrator includes support portions that extend from two side surfaces in a symmetrical form, and one part of each support portion is fixed to a vibrator holding member. Further, a piezoelectric device is bonded to one side of a rectangular part at a center portion of the vibration plate, and two projections are formed on opposing surfaces and contact the friction member with friction.

In general, when fixing a piezoelectric device on a vibration plate, a surface on which the piezoelectric device is to be fixed is finished into a uniform flat surface from which concavities and convexities, warping, burrs and the like are removed by a polishing process, and fixing is then performed using an adhesive or the like. As a result, the piezoelectric device can be closely adhered to the vibration plate, and a deformation that arises in the piezoelectric device can be reliably transmitted to the vibration plate.

However, with the ultrasonic motor disclosed in Japanese Patent Application Laid-Open No. 2011-254587, there is the problem that if warping, concavities and convexities, a deformation or the like arise in the vibration plate, a large amount of time is required to perform the polishing process, and furthermore the vibration plate becomes an irregular shape after the polishing. In particular, since the rigidity of the support portions of the vibration plate of the vibrator is low, warping or deformation is liable to occur. In a case where the support portions become warped in a manner such that the support portions protrude to the surface side or are deformed, there is the problem that, when polishing the vibration plate, an area from the vicinity of the support portions is polished first, and hence the overall form of the vibration plate becomes a semi-cylindrical shape. This leads to a decrease in the performance of the ultrasonic motor, such as a drift or variations in the resonance frequency of the vibration plate.

In the ultrasonic motor disclosed in Japanese Patent Application Laid-Open No. 2011-254587, no consideration is given to the method of manufacturing the vibration plate, and in the case of using compression molding that is a generally inexpensive manufacturing method, burrs and warping are liable to arise, and consequently the above described problems occur.

SUMMARY OF THE INVENTION

The present invention has been made to solve the above described problems, and an object of the present invention is to provide an actuator that has high performance, even when an inexpensive manufacturing method is used.

Another object of the present invention is to provide an actuator including a vibrator including a vibration plate and a piezoelectric device that generates a vibration in the vibration plate, a holding member that holds the vibrator, a friction member configured to contact the vibrator with friction, the friction member relatively moving with respect to the vibrator by the vibration, and a pressure member configured to contact the vibrator with a pressure onto the friction member, wherein the vibration plate includes a center portion including a surface on which the piezoelectric device is fixed, and support portions that extend from both ends of the center portion and are connected to the holding member, the vibration plate includes a friction-sliding surface that contacts the friction member on another surface on an opposite side to the surface, the support portion includes a fixing portion for fixing to the holding member, and a connection portion for connecting the center portion and the fixing portion, and the fixing portion is located between a position on the surface and a position on the friction-sliding surface in a pressing direction in which the vibrator is pressed onto the friction member by the pressure member.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Embodiment 1

An exemplary embodiment of the present invention will be described hereunder with reference to FIG. 1 and FIG. 2. A rotary motor that is formed in a unit as an actuator for driving a lens barrel of a digital camera or the like is described as an example of an actuator according to the present embodiment. However, the present invention can also be applied to a linear motor such as the linear motor disclosed in Japanese Patent Application Laid-Open No. 2011-254587. In addition, an ultrasonic motor can be applied as a representative actuator. Hereinafter, as embodiments, an actuator of the present invention is explained with an ultrasonic motor.

Figure 1:
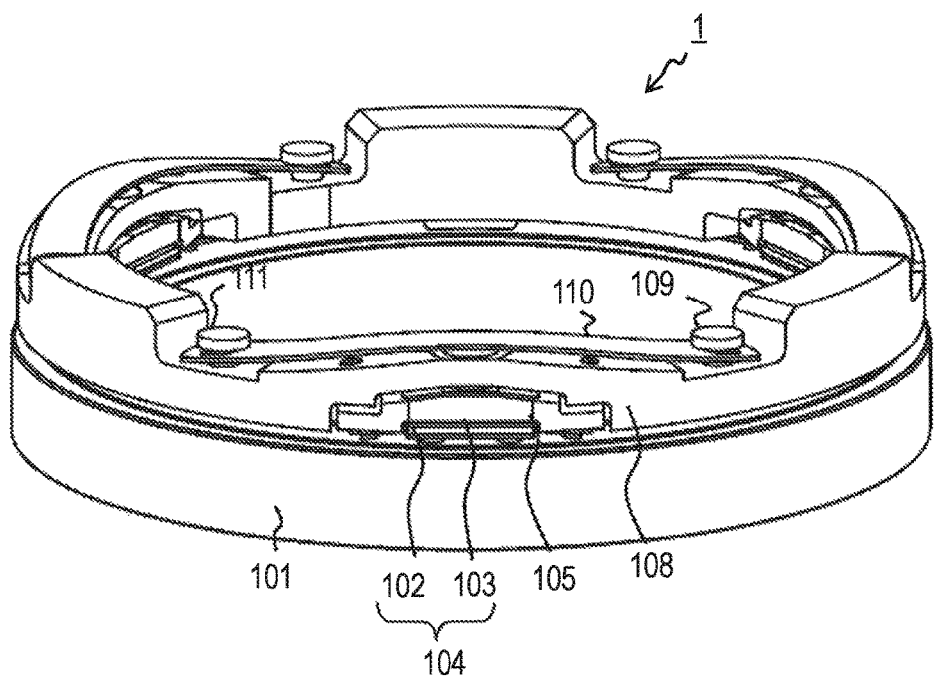
FIG. 1 is a perspective view illustrating an entire ultrasonic motor.
Figure 2:
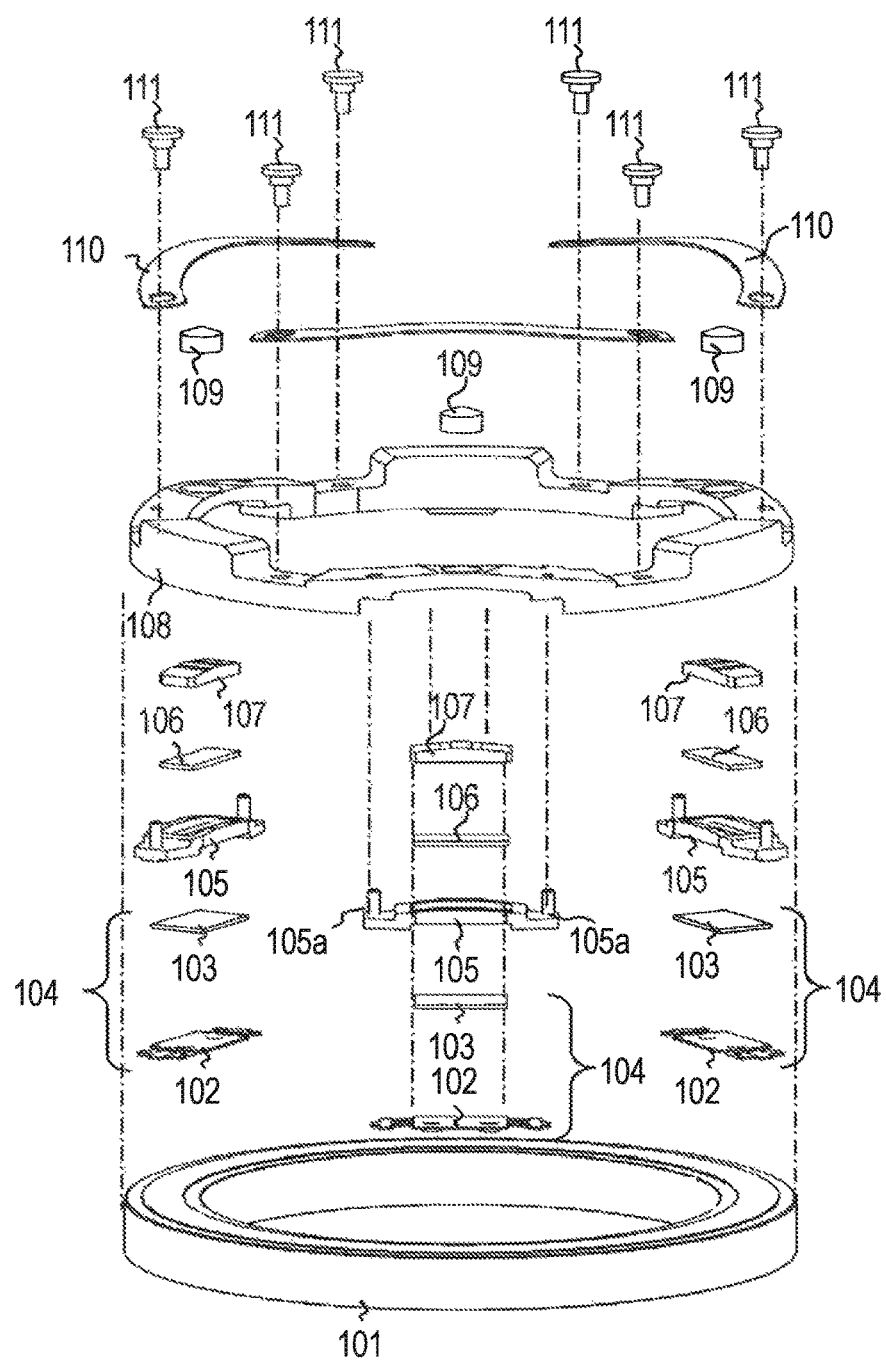
FIG. 2 is a perspective view illustrating the ultrasonic motor in an exploded state.

FIG. 1 is a perspective view illustrating the entire actuator. FIG. 2 is a perspective view illustrating the actuator in an exploded state. In the respective figures, like members are denoted by like reference numerals.

An ultrasonic motor 1 includes a rotor 101 that is a circular type of friction member, and a vibrator 104.

In the ultrasonic motor 1 of the present embodiment, the rotor 101 as a friction member is rotationally driven by three sets of the vibrators 104. In FIG. 1, to simplify the illustration, reference numerals are assigned to only one set among the three sets of vibrators.

The rotor 101 has an annular ring shape, and is driven to rotate in a manner that takes the center of the annular ring as the center of rotation. Each vibrator 104 includes a vibration plate 102 and a piezoelectric device 103. The piezoelectric device 103 is compression bonded to the surface of the vibration plate 102 by means of an adhesive or the like. Vibration of the vibration plate 102 is excited by applying a voltage to the piezoelectric device 103, and the excited vibration can cause an elliptical motion to be generated on a friction-sliding surface 102d of the vibration plate 102 that contacts the rotor 101. The elliptical motion causes the rotor 101 to perform rotational driving such that the rotor 101 undergoes relative movement with respect to the vibrators 104.

The ultrasonic motor 1 includes a ring member 108 that corresponds to the rotor 101. In each vibrator 104, felt 106 is affixed to one face of the piezoelectric device 103 to absorb vibrations thereof, and each vibrator 104 is attached to a holding member 105 in a manner such that the side on which the piezoelectric device 103 is disposed is positioned on the side of the holding member 105. Fitting projections 105a of the respective holding members 105 are inserted into positioning holes formed in a face on the rotor 101 of the ring member 108, so that the respective holding members 105 are held by the ring member 108. The vibrators 104 are held by the ring member 108 via the holding members 105. A perforated opening portion is formed in the center portion of each holding member 105. A pressure element 107 is inserted and fitted into the opening portion. The pressure element 107 is positioned between the ring member 108 and the felt 106. Each pressure element 107 can apply pressure to the vibrator 104 through the felt 106.

The ring member 108 that is on the opposite side to the rotor 101 includes shaft members 109 and plate springs 110. A pressure member is formed by the pressure element 107, the shaft member 109 and the plate spring 110. Each pressure member contacts the corresponding vibrator 104 while applying pressure to the rotor 101 that is the friction member. That is, each shaft member 109 is inserted into a hole portion that penetrates the ring member 108, and is held so as to be movable in only a direction that is perpendicular to the friction-sliding surface. The tip of each shaft member 109 contacts the corresponding pressure element 107 from the hole portion, and the rear end of the shaft member 109 contacts the corresponding plate spring 110 whose two ends are fixed to the ring member 108 by a screw 111, respectively. A convex portion is provided in the vicinity of the center of the tip of each pressure element 107, and a surface represented by a surface of the tip of the corresponding shaft member 109 comes in contact therewith. The surface of the tip of the shaft member 109 presses the convex portion of the pressure element 107 by means of an elastic force of the plate spring 110, and the pressure element 107 contacts the vibrator 104 through the felt 106 while pressing the rotor 101 that is the friction member. The direction of this pressing is defined as a "pressing direction".

In this way, each of the above described members are assembled to be unitized as the ultrasonic motor. When the ultrasonic motor is actually mounted in a lens barrel or the like, the friction member 101 is coupled to a focusing mechanism or a zoom mechanism for driving.

Figure 3A:
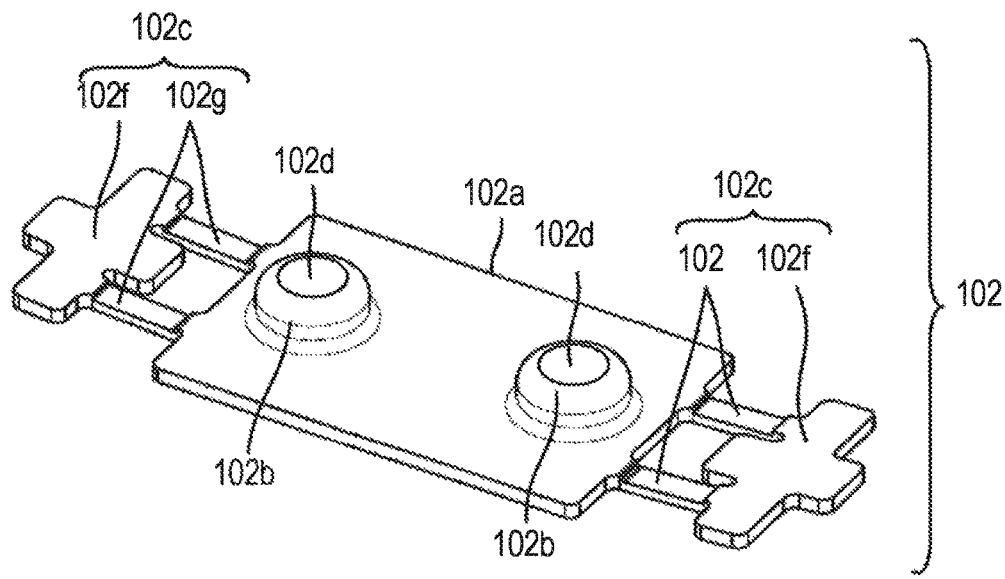
FIG. 3A is an enlarged perspective view for describing details of a vibration plate 102 of Embodiment 1, which is a perspective view that illustrates a surface on a side on which the vibration plate 102 contacts a friction member.
Figure 3B:
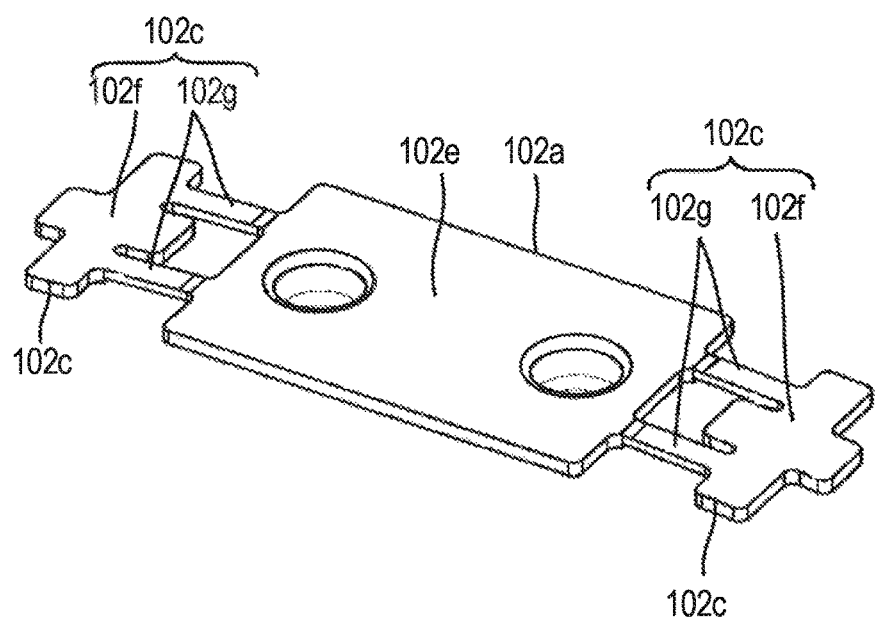
FIG. 3B is an enlarged perspective view for describing details of the vibration plate 102 of Embodiment 1, which is a perspective view that illustrates a surface on the opposite side thereof.
Figure 3C:
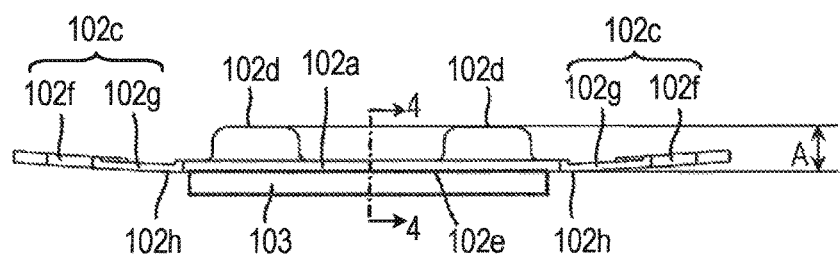
FIG. 3C is an enlarged perspective view for describing details of the vibration plate 102 of Embodiment 1, which is a view that illustrates a cross-section of the vibration plate 102.

Next, the vibration plate 102 is described in detail. FIGS. 3A to 3C are perspective views in which the vibration plate 102 of the ultrasonic motor 1 illustrated in FIGS. 1 and 2 is illustrated in an enlarged manner. FIG. 3A illustrates the vibration plate 102 as seen from the friction member 101 side. FIG. 3B illustrates the vibration plate 102 as seen from the piezoelectric device 103 side. FIG. 3C illustrates the vibration plate 102 as seen from a side face in the longitudinal direction of the vibration plate 102. Note that the piezoelectric device 103 is illustrated with a dotted line in FIG. 3C.

In the figures, the vibration plate 102 includes a center portion 102a that has a flat surface, and support portions 102c at two places that extend symmetrically from both ends of the center portion 102a. Two projections 102b are formed on one side of the center portion 102a.

A friction-sliding surface 102d is provided on an upper end face of each projection 102b. The friction-sliding surface 102d is a surface that contacts against the rotor 101 that is the friction member. In particular, to make the state of such contact favorable, the friction-sliding surface 102d is finished to a uniform flat surface by a polishing process or the like at the time of manufacture. The piezoelectric device 103 is fixed by adhesive or the like to a surface (flat portion) 102e on an opposite side to the side of the center portion 102a on which the projections 102b are formed. Similarly to the friction-sliding surface 102d, the surface 102e is also finished to a uniform flat surface by a polishing process or the like at the time of manufacture.

On the other hand, each of the support portions 102c includes a fixing portion 102f for fixing the vibration plate 102 to the holding member 105, and two connection portions 102g for connecting the fixing portion 102f to the center portion 102a. Various methods, such as bonding, deposition or welding, are conceivable as methods for fixing the fixing portion 102f and the holding member 105, and the strongest fixing method is desirable. The vicinity of the fixing portion 102f is configured to be a node or a vicinity of the node in vibrations, so that the vibrations generated at the piezoelectric device 103 are difficult to be transmitted even though the fixing portion 102f is fixed on the holding member 105.

As illustrated in FIG. 3C, bends that separate away from the surface 102e progressively from foot portions 102h connected to the center portion 102a toward the tips of the respective support portions 102c are provided in the fixing portions 102f and the connection portions 102g. That is, the respective fixing portions 102f and connection portions 102g are configured so as to be between the friction-sliding surfaces 102d and the surface 102e as indicated by an arrow A portion in FIG. 3C. That is, each fixing portion 102f is configured so as to be located between the position of the surface of the surface 102e and the position of the friction-sliding surface 102d in the pressing direction in which the rotor 101 that is the friction member is pressed by the vibrator 104 by means of the pressure member 107.

By adopting this configuration, the surface 102e for which polishing is required and the fixing portions 102f and connection portions 102g for which polishing is not required are not coplanar. It is thereby possible to polish substantially only the surface 102e without the polishing body contacting other portions. Accordingly, the fixing portions 102f and the connection portions 102g do not adversely affect the polishing process, and the polishing process can be significantly shortened in comparison to the conventional technology. Further, since the vibration plate 102 is not deformed after polishing, it is possible to realize an ultrasonic motor that has high performance.

Further, as illustrated in FIG. 3C, shortening of the polishing process is realized by providing a bend portion in a vicinity 102h of the foot of each connection portion 102g. However, a configuration may also be adopted in which a bend is not provided, and warping is intentionally generated in the fixing portions 102f and the connection portions 102g. With respect to the amount of warping, since the polishing amount of the surface 102e is around several tens of microns, a sufficient effect is produced by even a slight amount of warping. In particular, as illustrated in the figures, since the form of the connection portions 102g has low rigidity, warping can be easily generated.

Generally, the vibration plate 102 as used in the present invention is often manufactured by a compression molding process, and compression molding can also be utilized for the present invention. When a compression molding process is used, burrs arise during manufacture, and the burrs exert an adverse effect at the time of polishing. Therefore, according to the present invention a configuration is adopted that takes into consideration a direction in which burrs are generated so that the burrs do not exert an adverse effect on polishing. This configuration is described in detail hereunder using FIG. 4.

Figure 4:
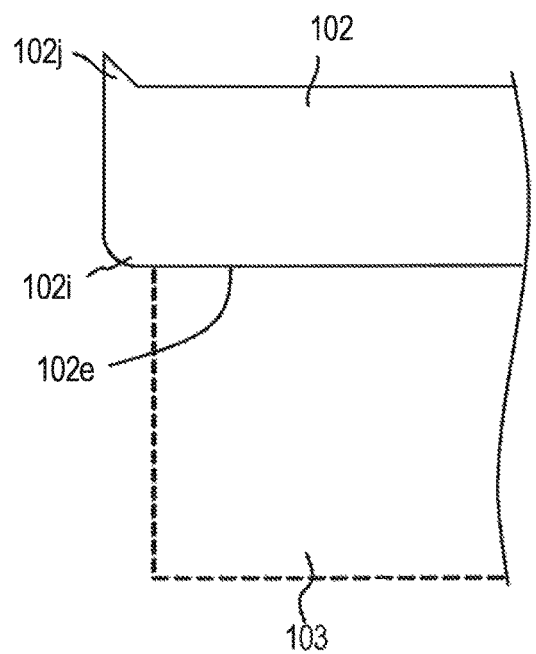
FIG. 4 is an enlarged partial cross-sectional view that is obtained by cutting the vibration plate 102 along a cross-section 4-4 shown in FIG. 3C, and that illustrates the vicinity of an end face of the cutting plane in an enlarged manner.

FIG. 4 is an enlarged partial cross-sectional view which illustrates, in an enlarged manner, the vicinity of an end face obtained by cutting the vibration plate 102 along a cross-section 4-4 shown in FIG. 3C. In FIG. 4, the piezoelectric device 103 is fixed to the surface 102e of the vibration plate 102, and a corner shear drop portion 102i and a burr portion 102j are formed by a compression molding process on the end face of the vibration plate 102. The corner shear drop portion 102i and the burr portion 102j that are formed by the compression molding process are produced when shearing a plate material with a metal mold during the compression molding process, and are produced on an entire edge of the end face. At such time, the shearing direction in the compression molding process is set so as to obtain the corner shear drop portion 102i without the burr portion 102j of the end face of the surface 102e arising when polishing is performed in a later process. Thus, the burr portion 102j does not exert an adverse effect during polishing. Accordingly, there is an effect of shortening the polishing process. Note that although the friction-sliding surface 102d is also finished into a uniform surface by polishing, as illustrated in FIG. 3A to FIG. 3C, since the friction-sliding surface 102d is formed by drawing during compression molding, a shear plane does not exist in the case of the friction-sliding surface 102d. Hence, burrs do not cause an adverse effect.

In the above described configuration, a flexible printed board (not illustrated) is connected to the piezoelectric device 103 that is fixed on the surface 102e, and by applying a desired alternating-current voltage thereto, two vibration modes that are in the pressing direction and the driving direction are excited in the vibration plate 102. At this time, by setting the application of the alternating-current voltage so that a desired phase difference can be generated between the vibration phases of the two vibration modes, an elliptical motion is generated at the friction-sliding surface 102d. The elliptical motion is generated at the vibrators at the three places illustrated in FIGS. 1 and 2, and is transmitted to the friction member 101 so that the friction member 101 can be rotationally driven. The details relating to the structure and vibration modes of the piezoelectric device 103 are similar to the contents discussed in Japanese Patent Application Laid-Open No. 2004-304887, and hence a detailed description thereof is omitted herein.

Figure 5:
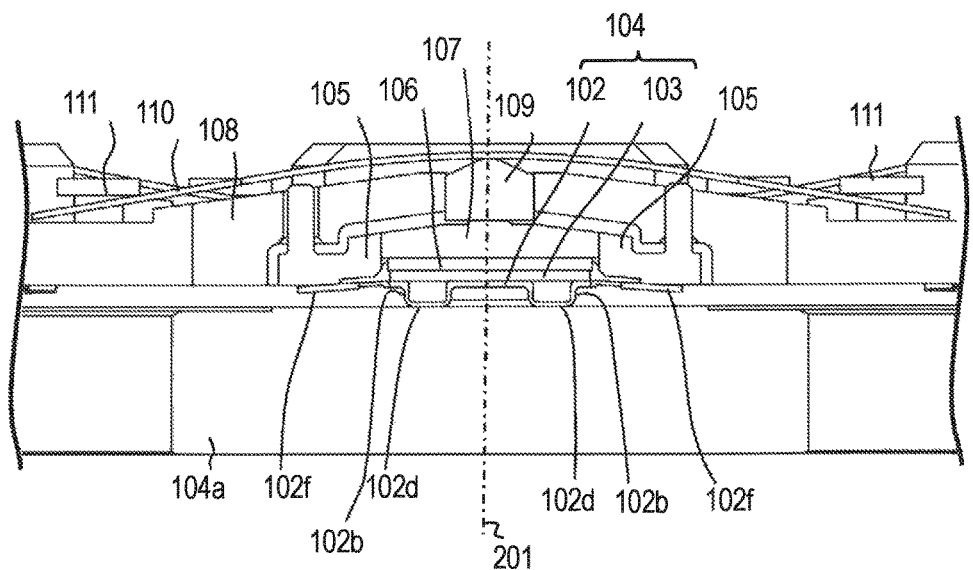
FIG. 5 is an enlarged cross-sectional view illustrating the vicinity of a vibrator in the ultrasonic motor.

FIG. 5 is an enlarged cross-sectional view illustrating the vicinity of one of the vibrators 104 in a state in which the respective members of the ultrasonic motor 1 have been assembled. The method of assembling the respective members is as described above. Only one location among the three locations at which the vibrators are provided is illustrated in an enlarged manner. The configuration at the remaining two locations at which the vibrators are provided are the same as the configuration illustrated in FIG. 5, and therefore a description thereof is omitted herein. FIG. 5 is a cross-sectional view taken along a plane including a line connecting centers of the projections 102b at two places on the vibration plate 102.

In FIG. 5, a central line 201 is defined which is perpendicular to the rotor 101 and from which the distances to the two projections 102b of the vibration plate 102 are equal. The friction-sliding surface 102d of the projections 102b of the vibration plate 102 of the vibrator 104 contact under a friction-contact condition with the rotor 101 that is the friction member. In the vibration plate 102 of the present embodiment, a bend is formed in the connection portion 102g to shorten the polishing process as described above with reference to FIGS. 3A to 3C, and therefore the fixing portion 102f has an inclined surface. Hence, the surface of the holding member 105 that contacts the fixing portion 102f also has a similar inclination. It is possible to securely fix the fixing portion 102f and the holding member 105 by welding or bonding. An elliptical motion as illustrated in the figure arises in the friction-sliding surface 102d of each projection 102b upon application of a predetermined voltage to the piezoelectric device 103.

The holding member 105 is positioned by being fitted in a hole portion of the ring member 108, and is configured to be movable in the direction of the central line 201. Further, the pressure element 107 is disposed inside the opening portion of the holding member 105, and is configured to be movable in the direction of the central line 201. An elliptical motion is generated in the friction-sliding surface 102d of the vibration plate 102 when a predetermined voltage is applied to the piezoelectric device 103 under a friction-contact condition that is caused by the pressurizing force of the pressure element 107, and thus the friction member 101 can be rotated.

Note that although Embodiment 1 has been described taking as an example a case of driving the friction member 101 to which the vibrator 104 side including the ring member 108 is fixed, a configuration may also be adopted in which, conversely, the vibrator 104 side may be driven and the friction member 101 may be fixed.

Embodiment 2

Embodiment 2 is a modification of Embodiment 1, and is an example in which a bend is provided at two places in the connection portions 102g of the vibration plate 102, and in which the surface 102e and the fixing portions 102f are configured to be parallel.

Figure 6A:
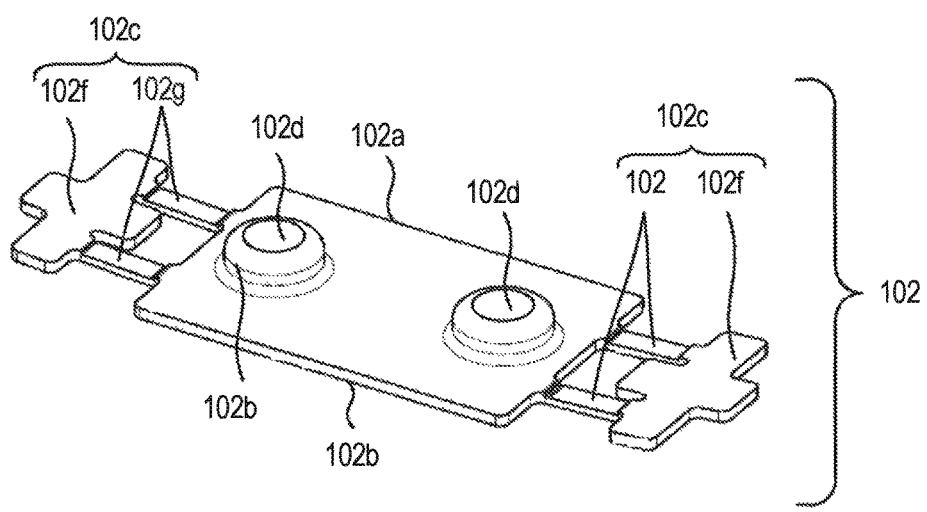
FIG. 6A is an enlarged perspective view for describing details of a vibration plate 102 of Embodiment 2, which is a perspective view that illustrates a surface on a side on which the vibration plate 102 contacts a friction member.
Figure 6B:
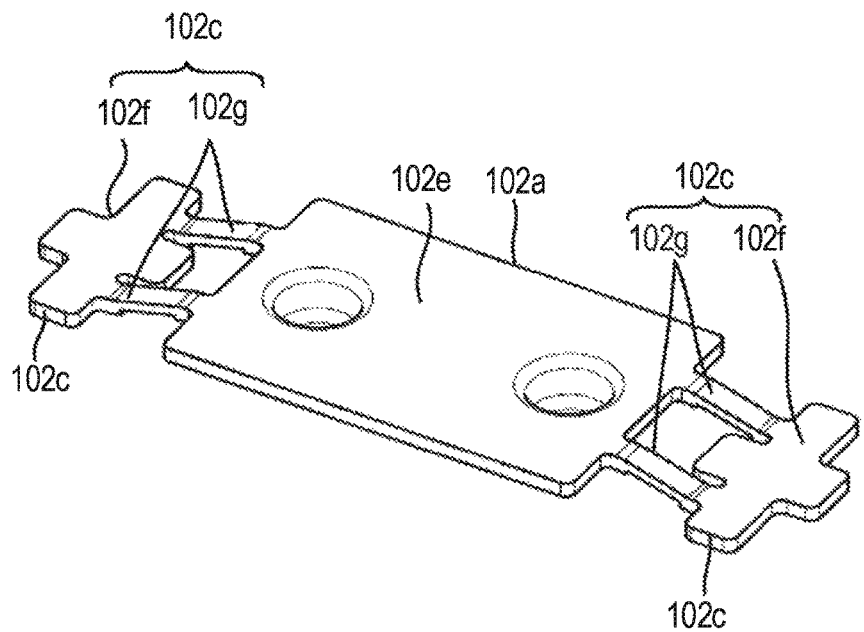
FIG. 6B is an enlarged perspective view for describing details of the vibration plate 102 of Embodiment 2, which is a perspective view that illustrates a surface on the opposite side thereof.
Figure 6C:
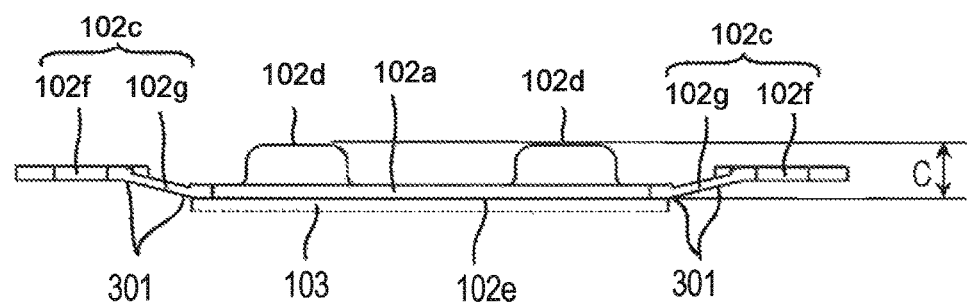
FIG. 6C is an enlarged perspective view for describing details of the vibration plate 102 of Embodiment 2, which is a view that illustrates a cross-section of the vibration plate 102.

FIGS. 6A to 6C are enlarged perspective views for describing the details of the vibration plate 102 according to Embodiment 2. FIG. 6A is a view as seen from the friction member 101 side. FIG. 6B is a view as seen from the piezoelectric device 103 side. FIG. 6C is a view as seen from a side face in the longitudinal direction. Note that members that are the same as in Embodiment 1 are denoted by the same reference numerals as in Embodiment 1, and a detailed description of such members is omitted hereunder.

As illustrated in FIG. 6C, a bend 301 is provided at two places in each connection portion 102g, namely, the vicinity of a foot that is connected to the center portion 102a and the vicinity of a foot that is connected to the fixing portion 102f. The bends 301 are set so that the surface 102e and the fixing portions 102f are parallel to each other.

At this time, as indicated by an arrow C portion in FIG. 6C, the fixing portions 102f and the connection portions 102g are configured so as to be between the friction-sliding surfaces 102d and the surface 102e. By adopting this configuration, the surface 102e for which polishing is required and the fixing portions 102f and connection portions 102g for which polishing is not required are not coplanar. It is thereby possible to polish substantially only the surface 102e. Accordingly, the polishing process can be significantly shortened in comparison to the conventional technology. Further, since the shape of the vibration plate is not deformed after polishing, it is possible to realize an ultrasonic motor that has high performance.

According to Embodiment 2 a configuration is adopted so that the fixing portions 102f and the surface 102e become parallel. It is not necessary to prepare an inclined surface as in the case of Embodiment 1 when fixing the vibrators 104 to the corresponding holding members 105, and hence the vibrators 104 can be fixed more simply. Further, since the positions of the respective fixing portions 102f can be freely changed within the range of the C portion, the degree of design freedom with respect to the layout is increased. Further, since the overall length when the vibration plate 102 is extended to form a flat surface can be altered by altering the position of the respective fixing portions 102f, the degree of design freedom with respect to the resonance frequency is also increased.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An actuator comprising:
   a vibrator including a vibration plate and a piezoelectric device that generates a vibration in the vibration plate; and
   a holding member that holds the vibration plate,
   wherein the vibration plate includes a center portion and a fixing portion connected to the center portion, the center portion configured to have a first surface on a first side on which the piezoelectric device is fixed and a contact portion for contacting a friction member on a second side opposite to the first side so that the vibration by the piezoelectric device causes relative movement between the friction member and the vibration plate,
   wherein the first surface is a polished surface, and
   wherein the holding member holds the fixing portion at a location between a first plane including the first surface of the center portion and a second plane including the contact portion of the center portion.

2. The actuator according to claim 1, wherein the contact portion is a polished surface.

3. The actuator according to claim 1, wherein a polish degree of the first surface is at least 10 micrometers and no more than 100 micrometers.

4. The actuator according to claim 1, wherein a surface of the fixing portion that contacts the holding member is not a polished surface.

5. An actuator comprising:
   a vibrator including a vibration plate and a piezoelectric device that generates a vibration in the vibration plate; and
   a holding member that holds the vibration plate,
   wherein the vibration plate includes a center portion and a fixing portion connected to the center portion, the center portion configured to have a first surface on a first side on which the piezoelectric device is fixed and a contact portion for contacting a friction member on a second side opposite to the first side so that the vibration by the piezoelectric device causes relative movement between the friction member and the vibration plate,
   wherein the first surface is a polished surface,
   wherein the fixing portion is offset from a first plane including the first surface of the center portion and is located between the first plane and a second plane including the contact portion of the center portion, and
   wherein a surface of the holding member that contacts the fixing portion is inclined from the first plane.

6. The actuator according to claim 5, wherein a surface of the fixing portion that contacts the holding member is inclined from the first plane.

7. The actuator according to claim 5, wherein the contact portion is a polished surface.

8. The actuator according to claim 5, wherein a polish degree of the first surface is at least 10 micrometers and no more than 100 micrometers.

9. The actuator according to claim 5, wherein a surface of the fixing portion that contacts the holding member is not a polished surface.

\* \* \* \* \*